United States Patent
Jähnke

(10) Patent No.: US 8,381,311 B2
(45) Date of Patent: Feb. 19, 2013

(54) METHOD FOR EXAMINING A TEST SAMPLE USING A SCANNING PROBE MICROSCOPE, MEASUREMENT SYSTEM AND A MEASURING PROBE SYSTEM

(75) Inventor: Torsten Jähnke, Berlin (DE)

(73) Assignee: JPK Instruments AG (DE)

( * ) Notice: Subject to any disclaimer, the term of this patent is extended or adjusted under 35 U.S.C. 154(b) by 445 days.

(21) Appl. No.: 12/600,289

(22) PCT Filed: May 16, 2008

(86) PCT No.: PCT/DE2008/000824
§ 371 (c)(1),
(2), (4) Date: May 6, 2010

(87) PCT Pub. No.: WO2008/138329
PCT Pub. Date: Nov. 20, 2008

(65) Prior Publication Data
US 2010/0218284 A1    Aug. 26, 2010

(30) Foreign Application Priority Data
May 16, 2007   (DE) .................. 10 2007 023 435

(51) Int. Cl.
    *G01Q 10/00*    (2010.01)
(52) U.S. Cl. ........... 850/1; 850/2; 850/3; 850/4; 850/13; 850/22; 850/33; 850/40
(58) Field of Classification Search .................. 850/1–4, 850/8, 13, 22, 33, 40; 250/306, 307
    See application file for complete search history.

(56) References Cited

U.S. PATENT DOCUMENTS

| 5,929,643 | A | | 7/1999 | Sakai et al. |
| 6,028,305 | A | * | 2/2000 | Minne et al. .................. 250/234 |
| 6,079,255 | A | | 6/2000 | Binnig et al. |

(Continued)

OTHER PUBLICATIONS

Despont M et al: "Dual-cantilever AFM probe for combining fast and coarse imaging with high-resolution imaging"; Proceedings IEEE Thirteenth Annual International Conf. on Micro-Electro Mechanical Systems, 2000, pp. 126-131.

*Primary Examiner* — Jack Berman
*Assistant Examiner* — Meenakshi Sahu
(74) *Attorney, Agent, or Firm* — Schmeiser, Olsen & Watts, LLP

(57) ABSTRACT

The invention relates to a method and to a device for examining a test sample using a scanning probe microscope. According to the method a first and a second measurement using a scanning probe microscope are carried out on the test sample using a measuring probe system in which a measuring probe and another measuring probe are formed on a common measuring probe receptacle. During the first measurement, in relation to the test sample, the measuring probe is held in a first measurement position and the other measuring probe is held in another non-measurement position, and the test sample is examined with the measuring probe using a scanning probe microscope. After the first measurement, by displacing in relation to the test sample, the measuring probe is displaced from the measurement position into a non-measurement position and the other measuring probe from the other non-measurement position into another measurement position. During the second measurement, in relation to the test sample, the measuring probe is held in the non-measurement position and the other measuring probe is held in the other measurement position, and the test sample is examined with the other measuring probe using a scanning probe microscope. The invention also relates to a measuring sensor system of a scanning probe microscope.

20 Claims, 5 Drawing Sheets

U.S. PATENT DOCUMENTS

Figure 1:
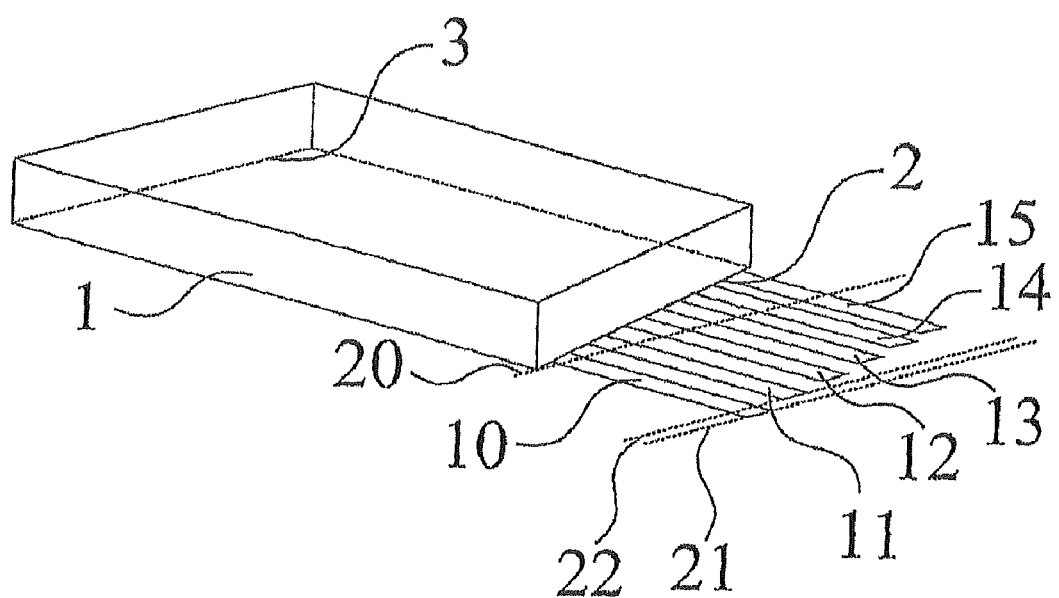

| | | |
|---|---|---|
| 6,469,293 B1 | 10/2002 | Shimizu |
| 6,583,411 B1 * | 6/2003 | Altmann et al. ............ 850/4 |
| 6,593,571 B1 | 7/2003 | Yasutake |
| 6,664,540 B2 | 12/2003 | Shimiza et al. |
| 6,798,226 B2 * | 9/2004 | Altmann et al. ............ 850/19 |
| 6,943,543 B2 * | 9/2005 | Gass et al. ............ 324/207.17 |
| 6,943,574 B2 | 9/2005 | Altmann et al. |
| 7,091,729 B2 * | 8/2006 | Kister ............ 324/755.07 |
| 7,098,678 B2 * | 8/2006 | Altmann et al. ............ 850/2 |
| 7,312,619 B2 * | 12/2007 | Altmann et al. ............ 850/1 |
| 2001/0028033 A1 | 10/2001 | Shimizu et al. |
| 2002/0020805 A1 | 2/2002 | Shimizu et al. |

* cited by examiner

METHOD FOR EXAMINING A TEST SAMPLE USING A SCANNING PROBE MICROSCOPE, MEASUREMENT SYSTEM AND A MEASURING PROBE SYSTEM

The invention relates to a method for examining a test sample using a scanning probe microscope, in particular for examining using a scanning probe microscope, a measurement system and a measuring probe system.

BACKGROUND OF THE INVENTION

Scanning probe microscopy (SPM) is a measurement and analysis technique in which a measuring probe scans a sample of a measurement medium to be examined and a topography of the sample is determined via a distance-dependent interaction between the measuring probe and the sample. However, matter constants or other sample information can also be obtained. The most prominent examples of this technique are the atomic force microscope (AFM) and the scanning tunneling microscope (STM). Further examples of this technology are in particular the scanning near field microscope (SNOM) and the scanning photon microscope (SPhM). Furthermore, an examination method classified as scanning probe microscopy is the recording of a force-distance curve in which the measuring probe is essentially only displaced along a vertical direction in relation to the examined sample for measurement purposes.

To measure the distance-dependent interaction between measuring probe and sample, when performing a distance spectroscopy, the measuring probe is displaced in relation to the surface, for example in a direction vertical to the sample surface, and the interaction between measuring probe and sample is measured. Alternatively, the sample can also be moved. Furthermore, a relative movement between measuring probe and sample can be provided for in which both the measuring probe and the sample are moved. When performing a scanning probe microscopy, for example, this distance spectroscopy to measure the interaction between measuring probe and sample can be used to measure forces between molecules by binding a molecule to the measuring probe and another molecule to the sample. Thereafter, the interaction between the two bound molecules can be measured. However, intra-molecular forces can also be measured by e.g. lowering the measuring probe onto the sample and in the course of this, waiting for them to bond. The measuring probe can then be removed again from the sample, the forces acting on the measuring probe being recorded in the course of this. Additionally, further measurements are possible in which an interaction is measured which correlates with two or more points with an allocated distance.

In scanning force microscopy, a component which is also referred to as a cantilever is usually used as the measuring probe. This enables to measure forces by detecting the deformation of the measuring probe. To minimize the degree of interaction and thus to improve the lateral resolution, in most cases, a measurement tip is attached to the free end of the cantilever. The following explanations refer to a cantilever without limiting the generality. The explanations accordingly apply to other forms of measuring probes in probe microscopy. The cantilevers are typically fixed to a base, in particular to ensure appropriate handling.

It is known that both untreated and pre-treated cantilevers are used as measuring probes in distance spectroscopy. In the case of an untreated cantilever, binding of the sample during the measurement is non-specific. For example, in this connection, this refers to drawing molecules from their ambient medium by binding to the cantilever to measure the interaction of the molecules with the ambient medium. However, the molecules which are drawn can also be characterized more precisely in this connection. DNA molecules, for examples, display a specific spectroscopy curve due to an internal conformation transformation.

Especially specific bonds can be examined with a pre-treated cantilever. Such an examination can be advantageous if the formation of undesired bonds which thereafter can possibly hardly be separated from each other again is to be prevented during the measurement. It is therefore usual practice to bind one or more molecules to the measuring probe implemented as a cantilever which then forms a receptor-ligand system with the bound molecule(s). It is also known to bind whole cells to a measuring probe forming the cantilever and cause an interaction of this system with a sample, for example a biological material, or with other cells. In this case, it can be advantageous, for example, to use a cantilever without a tip. Pre-treatments of measuring probes, in particular of cantilevers, are known in different embodiments, for example in the form of hydrophobizing the measuring probe.

Known possibilities to pre-treat the cantilever generally lead to the coating of the measuring probe, in least in sections. A cell attached to the cantilever thus covers a section of the surface of the cantilever. In this connection, it can be planned to initially provide the cantilever with a coating in the course of the pre-treatment, in particular an adhesion-promoting coating onto which subsequently a substance to be measured is applied. Generally, in the following, the material applied to the measuring probe, in particular the cantilever, in the course of the pre-treatment is referred to as a probe substance, it being a single material or a combination of several materials which comprises an adhesion-promoting base and a substance arranged on this and to be examined, for example. A (base) coating being applied in the course of the pre-treatment and being comprised by the probe substance is also referred to as a probe coating.

If a pre-treated cantilever is used in the distance spectroscopy, several handling problems result in practice. The probe substance applied to the measuring probe is usually burdened by each mechanical contact with the sample in such a way that ageing of the probe substance occurs after one or more individual experiments. In the present application, the term "ageing" is very generally used for a change in the desired state of the probe substance which was brought about at the start of the distance spectroscopy measurements for the purposes of the measurement. However, ageing can not only occur due to the implementation of measurements, but also without such a measurement, for example, when using a probe substance in the form of a cell, no physiological conditions set for the cell are given before or also during the measurement.

The ageing of the probe substance can also result in decreasingly less specific bonds taking place during the implementation of the distance spectroscopy measurement, whereby the number of individual experiments has to be increased significantly. In a less specifically performed individual measurement, particular attention has to be paid to the fact that the measuring probe still contains the probe substance in the required manner in each experiment. Thus, for example, it would be possible for a probe substance implemented as a hydrophobic coating to slowly convert into a hydrophilic coating which would bias the measurement results severely. The implementation of the probe substance as a cell coating in which often only one cell fits onto the cantilever can result in the cell dying and changing very significantly already before performing the measurement experiment, thus it not being possible any longer to perform the actual measurement. This can also lead to incorrect measurement results if this event is taking place unnoticed. Using an untreated cantilever can lead to an adsorbate being formed through the contact with the sample such that even unspecific bonds are no longer possible.

Besides the measurements mentioned above, other measurements are also affected by the damaging, for example imaging methods, in particular by the damaging of the probe tip relevant to the interactions. If a surface topography is determined, for example, this is in particular influenced by the geometry of the tip of the measuring probe. Lithography shall be mentioned as another important example in which, for example, a structure is scratched into a sample by means of a tip and this structure is subsequently to be imaged once more for control purposes. However, as the tip is damaged by the scratching process, it is no longer possible to obtain an image of good quality.

If an ageing process interfering with or even preventing the measurement or else another undesired damaging of the measuring probe has occurred, this being pre-treated or untreated, the measuring probe is usually replaced. This replacement of the measuring probe takes time as it normally can only be performed manually. If the measuring probe is a cantilever, for example, this is fixed to a base which also serves to permit to position the cantilever without any destruction. This base is typically integrated into a measuring probe receptacle which is held in the scanning probe microscope. The different implementations of this include, for example, supporting it with a spring or supporting it by means of vacuum. This support now has to be detached when replacing the measuring probe to permit to insert a new measuring probe.

Another disadvantage of the replacement of the probe is that a contamination of the measurement environment, for example the fluid or also the sample itself, becomes more likely with each replacement process.

Furthermore, a disadvantage is that after the replacement of the base, it is no longer possible to find a sample point again at once. A solution for this exists, for example, in that the measuring probe base is structured and this structure is positioned in a precise distance to the measuring probe tip. If now a corresponding measuring probe receptacle is present in the scanning probe microscope, finding the structure again with the measuring probe tip is made possible. However, this procedure involves considerable expenditure both in terms of the production of the measuring probe and the equipment.

SUMMARY OF THE INVENTION

The object of the invention is to provide an improved method for examining a test sample using a scanning probe microscope, in particular for examining a test sample using a scanning probe microscope, a measurement system and a measuring probe system which allow for the implementation of examinations using a scanning probe microscope in a simplified manner and with reduced time expenditure, where in particular the elaborate replacement of the measuring probe should be required less often.

According to the invention, the object is solved by means of a method for examining a test sample using a scanning probe microscope, a measurement system and a measuring probe system.

The invention encompasses the idea to carry out, in a method for examining a test sample using a scanning probe microscope, in particular for examining using a scanning probe microscope, a first and a second measurement using a scanning probe microscope on the test sample using a measuring probe system in which a measuring probe and another measuring probe are formed on a common measuring probe receptacle. During the first measurement, in relation to the test sample, the measuring probe is held in a first measurement position and the other measuring probe is held in another non-measurement position, and the test sample is examined with a measuring probe using a scanning probe microscope. After the first measurement has been carried out, by displacing in relation to the test sample, the measuring probe is displaced from the measurement position into a non-measurement position and the other measuring probe from the other non-measurement position into another measurement position. The measurement position and the other measurement position can at least partially coincide as far as the positions of respectively characterizing position parameters are concerned. For example, the measurement position of the measuring probe in the first measurement and the other measurement position of the other measuring probe in the second measurement in relation to elements of the measurement installation can be identical. In this way, different portions of the test sample can be examined if the measurement position and the other measurement position differ in terms of their relative positioning in relation to the test sample. If, however, the test sample is held in its relative position to the measurement installation, a repeat examination of a particular section of the test sample is carried out in this case. However, the measurement position and the other measurement position can also be completely different in terms of the characterizing position parameters.

During the second measurement, in relation to the test sample, the measuring probe is then held in the non-measurement position and the other measuring probe is held in the other measurement position, and the test sample is examined with the other measuring probe using a scanning probe microscope. In this way, the implementation of the measurement using a scanning probe microscope which comprises a first measurement stage and a second measurement stage is made possible without it being required that a replacement of the measuring probe takes place. In fact, the measuring probe and the other measuring probe which are both arranged on the common measuring probe receptacle are brought into the allocated measurement position or the allocated non-measurement position, depending on the current measurement stage. In this way, examinations using a scanning probe microscope, in particular by means of a scanning probe microscope, can be carried out with reduced time expenditure and more convenient for the user.

Another aspect of the invention relates to a measurement system for examining a test sample using a scanning probe microscope which can be used for the above-described method for examining using a scanning probe microscope. Furthermore, a measuring probe system is provided which can be employed in the measurement system and in the method for examining the test sample using a scanning probe microscope and in this respect is implemented in a particular way for this purpose.

An allocated measurement position of a measuring probe is characterized in that an interaction between measuring probe and test sample to be examined which serves the examination using a scanning probe microscope can take place in this position. In contrast, in the case of an allocated non-measurement position, an interaction between measuring probe and sample to be examined which serves the measurement using a scanning probe microscope does not take place. The latter can be achieved, for example, by choosing the distance between measuring probe, in particular an measuring-active measuring probe part, and the test sample to be examined that high that a metrological relevant interaction does not take place. However, a non-measurement position can also be created when the measuring-active measuring probe part is pressed onto the test sample, namely in such a manner that any metrological contribution to the examination using a scanning probe microscope is prevented and suppressed. For example, after it was used for a previously performed measurement, the measuring-active measuring probe part can simply be moved along on a surface section of the test sample, scratching said section.

The displacement between allocated measurement position and allocated non-measurement position of the measuring probe is typically based on a relative movement between measuring probe and test sample, in particular a surface section of the test sample to be examined. Such a relative movement can be achieved both by means of displacing the test sample and by means of displacing the measuring probe(s). A combination of these two relative movements can also be provided.

In a preferred embodiment, the measuring probe and the other measuring probe which are formed on the common measuring probe receptacle may be so-called cantilevers which are suitable for an examination of the test sample using a scanning probe microscope. Not only in this configuration is it possible for the measuring probes which are in turn supported on the common measuring probe receptacle to distinguish between the measuring-active measuring probe part, by means of which an interaction with the sample is taking place during the measurement, and an allocated measuring probe bar which carries the measuring-active measuring probe part and in turn interlinks with the measuring probe receptacle. In a possible embodiment, the measuring-active measuring probe part has a measurement tip or measuring probe tip.

A preferred further development of the invention provides for the displacement in relation to the test sample being performed at least partly by means of a joint movement of the measuring probe and the other measuring probe which optionally comprises a displacement of the measuring probe receptacle. As the measuring probe and the other measuring probe are formed on the common measuring probe receptacle, a joint movement of the measuring probe and the other measuring probe is in principle made possible by means of a movement of the common measuring probe receptacle, for example by displacing the measuring probe receptacle. However, the joint movement of the measuring probe and the other measuring probe is not mandatory in this design as the measuring probe receptacle may be formed by several elements, for example, which can both be discretely and jointly displaced whereby in each case measuring probes formed thereon can also be discretely or jointly displaced. For example, individual block-like elements of the common measuring probe receptacle can serve to receive one or more measuring probes in each case. The block-like elements can be coupled to a respectively allocated controlling element. The joint movement of the measuring probe and the other measuring probe can comprise any types of movement, for example a swivelling, tilting or displacing action or combinations thereof.

In a practical implementation of the invention, it can be provided for the displacement in relation to the test sample being performed at least partly by means of a discrete movement of the measuring probe and the other measuring probe in which at least the measuring probe or at least the other measuring probe is moved.

An advantageous embodiment of the invention provides for at least the measuring probe or at least the other measuring probe being moved by displacing an allocated measuring probe bar, optionally by means of a self-deformation. Besides a displacement of the measuring probe and/or the other measuring probe by means of a displacement of the measuring probe receptacle, at least the measuring probe or at least the other measuring probe can be reached alternatively or additionally by means of displacing an associated measuring probe bar which in turn carries an measuring-active measuring probe part which sometimes is also shortened referred to as a measuring probe. If the measuring probe bar is equipped with a bimetal, for example, the measuring-active measuring probe part can be displaced by means of self-deformation of the measuring probe bar. Such a displacement is then also reversible. The displacement in this case relates to the change in position between measurement position and non-measurement position.

A further development preferably provides for the displacement of the allocated measuring probe bar comprising a swivelling movement of the measuring probe bar by means of which an angular position of the allocated measuring probe bar is changed. By means of swivelling the measuring probe bar, the measuring-active measuring probe part formed thereon is again displaced between non-measurement position and measurement position. The swivelling movement of the measuring probe bar can also at least partly be caused by specifically moving the common measuring probe receptacle or a subcomponent thereof.

In an advantageous configuration of the invention, it can be provided for the displacement in relation to the test sample for the measuring probe and/or the other measuring probe comprising a height adjustment changing a vertical distance to an examination section of the test sample. This represents a possibility for the relative displacement which can be realized with little expenditure which in turn in particular serves for the displacement between non-measurement position and measurement position. In this connection, the relative movement can take place both by means of displacing the test sample and also alternatively or additionally by means of displacing the measuring probe. Both relative movements lead to a changed height setting of the measuring probe and/or the other measuring probe above the examination section of the test sample.

A further development of the invention can provide for the height adjustment being carried out as a relative movement along a displacement direction perpendicular to the examination section of the test sample. Through this, a space-saving height adjustment is made possible as the displacement means is formed essentially vertical to the surface of the examination section. In contrast to this, a height adjustment is in principle also possible by means of a displacement along a displacement direction which, together with the surface of the examination section, occupies an angle of less than 90° such that the height adjustment also comprises a lateral relative movement.

A preferred further development of the invention provides for the measuring probe receptacle being moved for the displacement in relation to the test sample.

In a practical configuration of the invention, it can be provided for at least partially overlapping examination sections on the test sample being examined in the first measurement and the second measurement using a scanning probe microscope. In the course of the examination using a scanning probe microscopy, it can be provided for not only partially overlapping examination sections being analyzed several times one after another with different measuring probes. Especially in such an implementation of the measurement method, several measuring probes are one after another brought into the essentially identical measurement position. The measurement positions of the different measuring probes are in this case characterized by an essentially identical relative position to the same section of the test sample to be examined.

An advantageous embodiment of the invention provides for at least one displacement movement selected from the following group of displacement movements comprises at least one approximate displacement or at least one fine displacement which differ in terms of the positioning accuracy being achievable with the respective displacement: displacement of the measuring probe between the measurement position and the non-measurement position and displacement of the other measuring probe between the other measurement position and the other non-measurement position.

A further development of the invention preferably provides for the measuring probe during the displacement between the measurement position and the non-measurement position as well as the other measuring probe during the displacement between the other measurement position and the other non-measurement position staying within an allocated measurement volume.

In an advantageous implementation of the invention, it can be provided for the measuring probe during the displacement from the measurement position into the non-measurement position being arranged above an area of the test sample which was already previously examined using a scanning probe microscope. This results in the advantage that the measuring probe cannot damage any sections of the test sample still to be examined in the non-measurement position as, in the non-measurement position, it is positioned in areas of the test sample which were already examined. Such an implementation of the method can be obtained, for example, by gradually examining the test sample along an examination path with several measuring probes using a scanning probe microscope, the sections along the examination path being examined consecutively in a maintained advance direction. This type of examination also makes it possible, for example, to simply bring a measuring probe after its use for the examination using a scanning probe microscopy into a non-measurement position in which the measuring probe scratches along the surface of the test sample, this surface contact only occurring in areas which were already examined.

Preferred implementations of the measurement system for examining the test sample using a scanning probe microscope are explained in the following.

A further development of the invention can provide for an measuring-active measuring probe part on the measuring probe and an measuring-active measuring probe part on the other measuring probe being arranged equidistantly from a diagonal edge of the common measuring probe receptacle. In this connection, the measuring-active measuring probe part of the measuring probe and the actively measuring part of the other measuring probe can be arranged in a serial arrangement extending crosswise such that the actively measuring measuring probe parts are bit by bit arranged offset to the front or to the back. The diagonal edge is preferably formed diagonal to a lateral edge of the common measuring probe receptacle which in turn extends essentially parallel to the longitudinal extension of the measuring probes.

A preferred further development of the invention provides for the measuring probe and the other measuring probe in the measuring probe system being supported on a diagonal face formed on the common measuring probe receptacle which optionally is formed on the measuring probe receptacle by means of a prism-shaped component. In the examination using a scanning probe microscope, the diagonal face formed on the common measuring probe receptacle is tilted towards the plane of the measuring probes stretching from the x and y adjustment directions. If the measuring-active measuring probe part of the measuring probe and the measuring-active measuring probe part of the other measuring probe are then additionally arranged in different distances from the common measuring probe receptacle, the displacement between allocated non-measurement position and allocated measurement position is made possible simply by means of a height adjustment.

In a practical implementation of the invention, it can be provided for the measuring probe and the other measuring probe in the measuring probe system each being formed with a bendable measuring probe bar. The bending is preferably reversible.

An advantageous embodiment of the invention provides for the measuring probe and the other measuring probe in the measuring probe system being formed essentially coinciding in relation to at least one measuring probe property selected from the following group of measuring probe properties: spring constant, applied probe substance, probe coating and frequency of resonance. Besides the essentially coinciding configuration of the measuring probe and the other measuring probe, it can also be provided for the measuring probes being individually configured in relation to the mentioned parameters in such a way that no two measuring probes are really identical. The individual configuration of the parameters for the measuring probes allows for placing different measuring probes on the common measuring probe receptacle which then can be used for different measurement tasks within the scope of an examination using a scanning probe microscope without replacing the measuring probes. Through this, it is in particular possible to react on sections of the test sample differing in terms of their properties. However, the identical calibration of at least one of the parameters, for example the spring constant, in combination with the differing calibration in terms of other parameters can also be provided for. When an essentially given identity of properties of the measuring probes is mentioned herein, production tolerances occurring in the production of measuring probes, for example cantilevers, have to be considered. An identity of parameters is usually given within the production tolerances.

Preferably, a further development of the invention provides for the measuring probe and the other measuring probe being arranged to be height-adjusted by means of the measuring probe displacement means, optionally along a displacement direction perpendicular to an examination section of the test sample.

In an advantageous configuration of the invention, it can be provided for the measuring probe and the other measuring probe being formed displaceable by means of a joint movement.

A further development of the invention can provide for the measuring probe and the other measuring probe being formed displaceable by means of a discrete movement.

The measuring probe system for a scanning probe microscope can preferably be further developed in accordance with the implementations of the system of measuring probes provided in the measurement system, the implementations having been explained in the context of the measurement system. The measuring probe system can be configured in such a way that the measuring probes can be displaced between measurement position and allocated non-measurement position by means of passive movement or active movement. The latter is implemented, for example, by displacing the measuring probes in relation to the common measuring probe receptacle, while in one configuration the measuring probe receptacle is moved during the passive displacement to achieve the displacement between the positions of the measuring probes.

The further development variants which allow for a displacement between measurement position and non-measurement position by means of height adjustment, this displacement naturally comprising a displacement in both directions are particularly preferred.

DESCRIPTION OF PREFERRED EXEMPLARY EMBODIMENTS OF THE INVENTION

Figure 2:
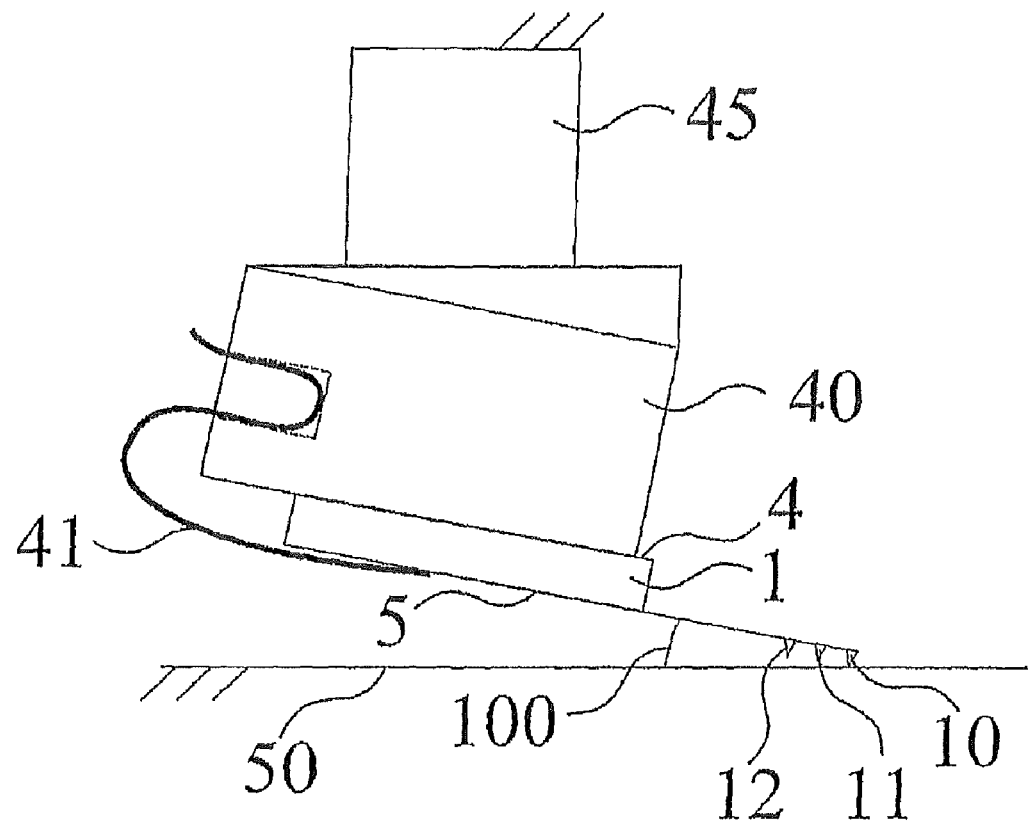
Figure 3:
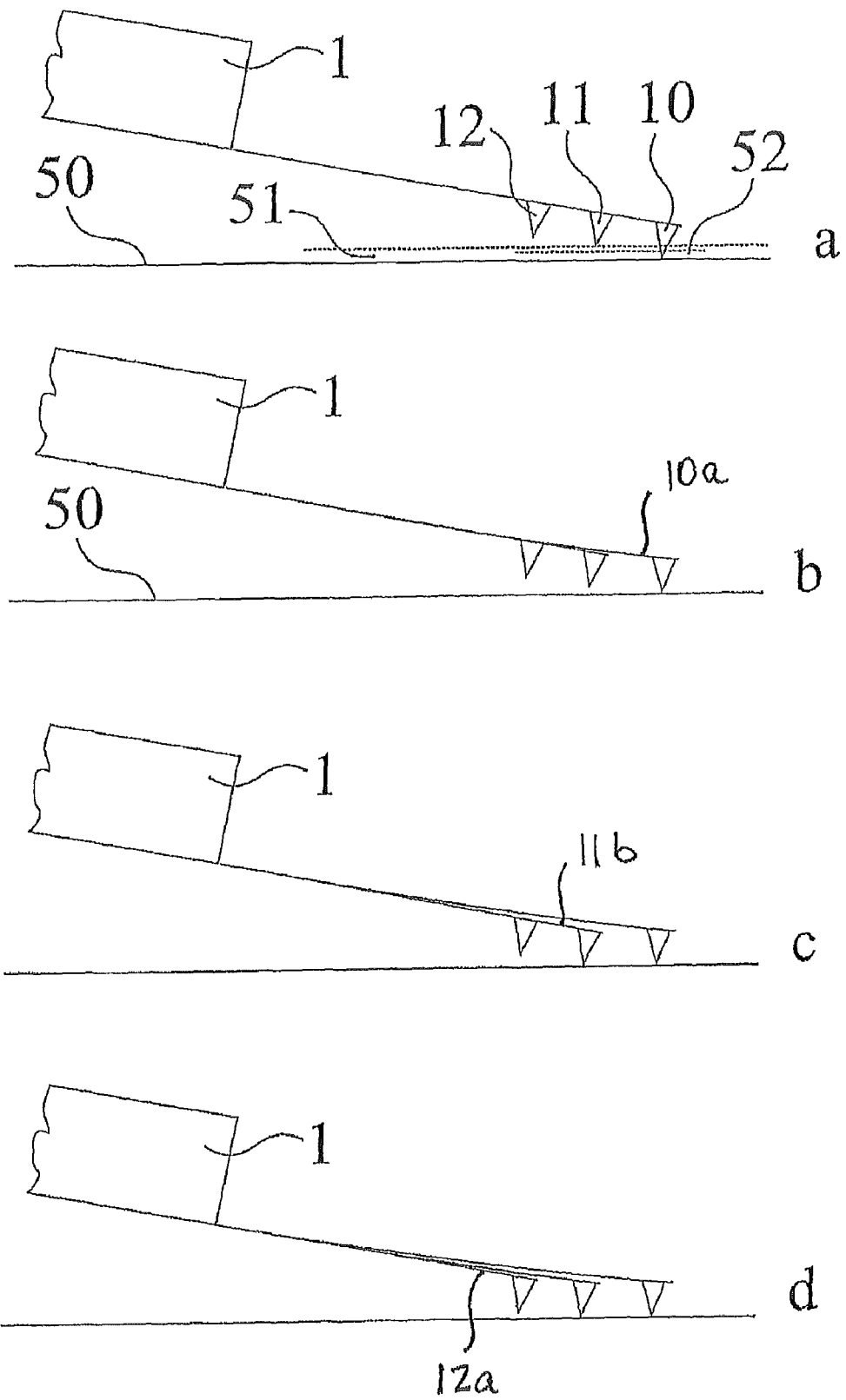
Figure 4:
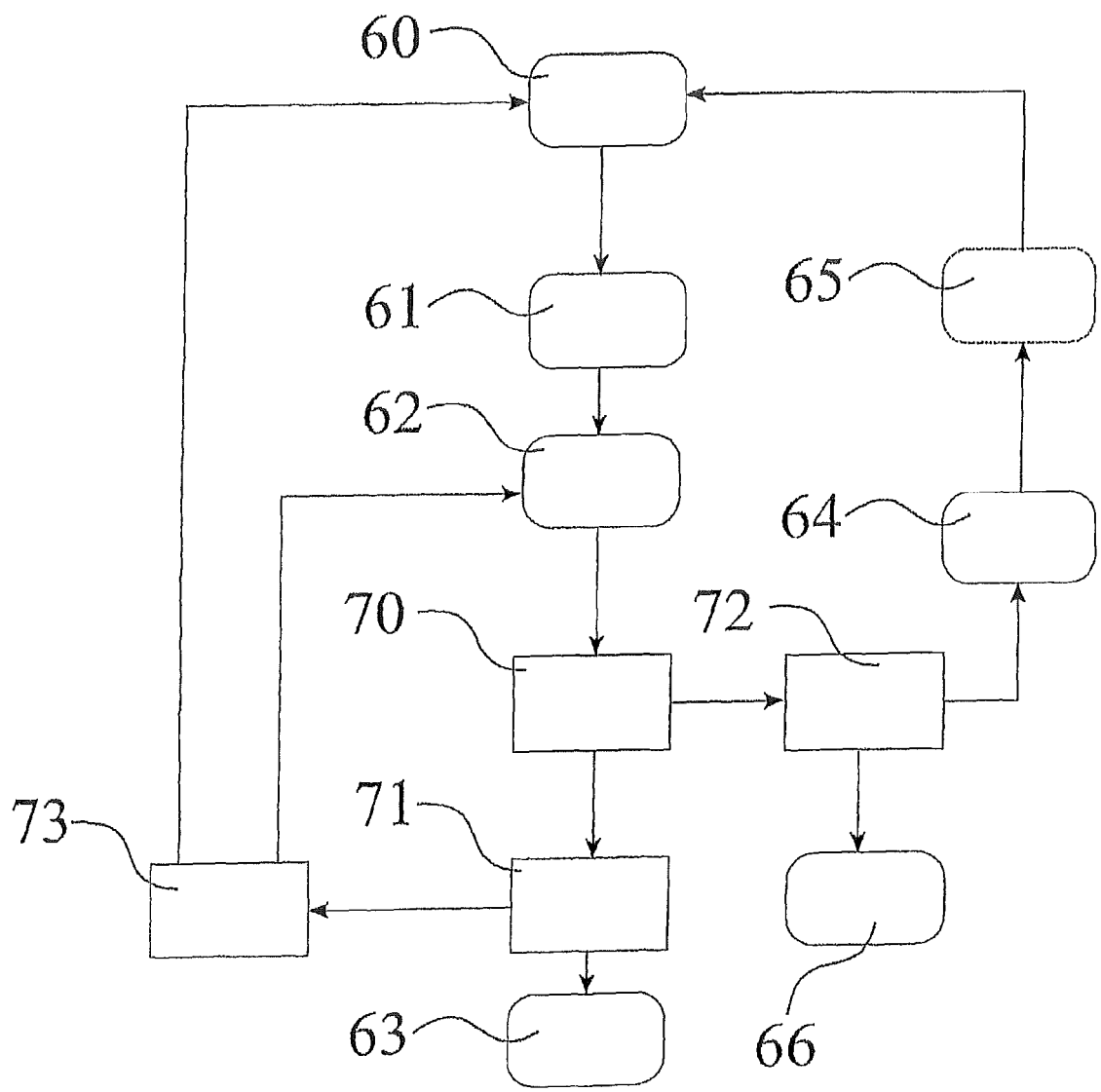

In the following, the invention is explained in more detail using exemplary embodiments with reference to figures of a drawing. They show:

FIG. 1 an arrangement with a measuring probe receptacle, several measuring probes being jointly formed thereon;

FIG. 2 an arrangement with a measuring probe receptacle, several measuring probes being jointly arranged thereon, and a measuring probe displacement means to which the common measuring probe receptacle is coupled;

FIG. 3 several depictions to illustrate the displacement of measuring probes being jointly formed on the measuring probe receptacle between measurement position and non-measurement position;

FIG. 4 a flowchart; and

Figure 5:
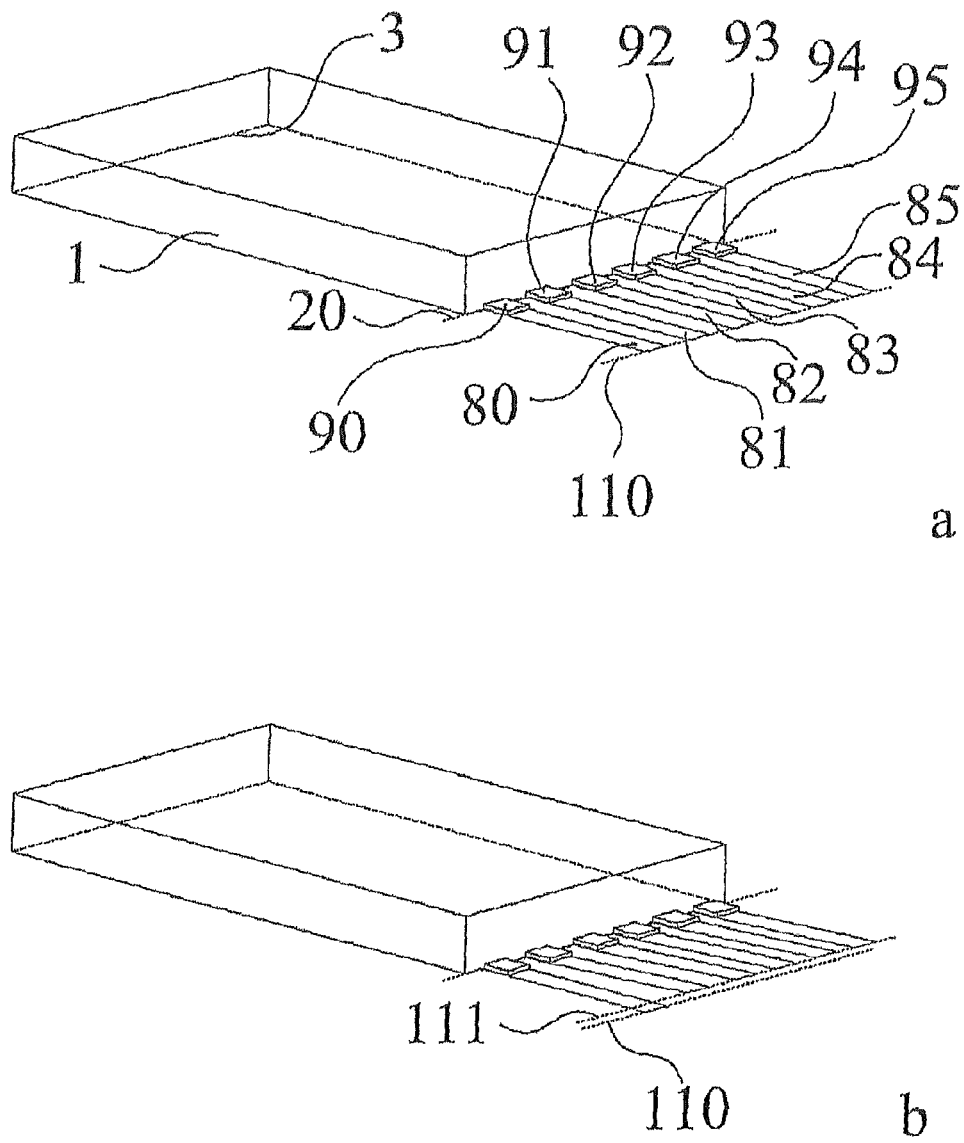

FIG. 5 another arrangement with a measuring probe receptacle and several measuring probes formed thereon.

FIG. 1 shows an arrangement with a measuring probe receptacle 1, also being shortened referred to as a base, several measuring probes or probes 10, . . . , 15 being arranged thereon which are implemented as so-called cantilevers in the depicted embodiment. To simplify the illustration, the measuring probe receptacle 1 has essentially a cuboid shape. However, this is only exemplary as the measuring probe receptacle 1 can in principle take any shape, for example also a pyramid shape. The several measuring probes 10, . . . , 15 extend from a front lower edge 2 of the measuring probe receptacle 1.

When performing a measurement, a bending of the measure probes 10, . . . , 15 triggered by an interaction with the test sample to be examined is measured by optically scanning the test sample, for example. Laser light is used for this, for example, which is directed onto a detector (not shown). Such an optical scanning process, like other methods for detecting the interaction of the measuring probes 10, . . . , 15 with the test sample, is known in different implementations and these methods can optionally be employed in connection with the different embodiments of the invention, depending on the use.

A guide line 20 shows a (hypothetical) extension of a front lower edge of the measuring probes 10, . . . , 15 which extends parallel to the rear lower edge 3. Not all the measuring probes 10, . . . , 15 terminate at the front in a guide line 21 which extends parallel to the guide line 20. In fact, this applies only to one of the measuring probes 10, . . . , 15, namely the measuring probe 10. The remaining measuring probes are bit by bit offset to the back. The distance between neighboring measuring probes is exemplified using another guide line 22.

The front lower edges of the several measuring probes 10, . . . , 15 do not generally have to be in a straight line. In fact, it can also be provided for an offset being in each case formed for neighbouring measuring probes such that a kind of stepped arrangement results which in turn can be implemented parallel to the rear lower edge 3.

FIG. 2 shows an arrangement in which several measuring probes 10, 11, 12 are formed on the common measuring probe receptacle 1 which in turn is held on a lower surface 4 on a receptacle part 40, namely by means of a spring element 41. Alternatively or additionally, the fastening can be carried out in other implementations by means of a vacuum and/or an adhesive bond, in particular by bonding. In this way, the several measuring probes 10, 11, 12 are kept above a test sample or sample 50 to be examined by a scanning probe microscope. The implementation of the receptacle component 40 and the measuring probe receptacle 1 supported thereon in a planar manner is exemplary. Other embodiments can be provided for, for example by means of projections and recessions on the surfaces resting thereon.

An angle 100 is formed between the test sample 50, namely its surface, and an area on an upper surface 5 of the measuring probe receptacle 1, the angle typically being in the range of between about 5° and about 15°. In this way, when performing a measurement in which the measuring probes 10, 11, 12 or their measuring-active measuring probe parts, respectively, are brought close to the test sample 50, an unintentional contact between the spring element 41 and the test sample is avoided. A relative movement between test sample 50 and measuring probe receptacle 1 occurs in the examination of the test sample 50 using a scanning probe microscope. In the depicted exemplary embodiment, the relative movement is at least partly carried out by means of a controlling element 45 implemented as a piezo element. The height of the measuring probe receptacle 1 is adjusted by means of the controlling element 45 such that initially the measuring probe 10, then the measuring probe 11 and thereafter the measuring probe 12 are brought into a measurement position in which the examination using a scanning probe microscope, in particular the examination using a scanning probe microscope on the test sample 50 is carried out. If the measuring probe 10 is in the measurement position, the measuring probes 11 and 12 are still in a non-measurement position. Another lowering of the measuring probe receptacle 1 then leads to the measuring probe 10 initially being brought from the measurement position into an allocated non-measurement position in which the measuring probe 10 is pressed onto the test sample 50, overcoming any measurement activity, and is guided along this, scratching the test sample. It is then the turn of the measuring probe 11 in the allocated measurement position to perform an examination using a scanning probe microscope. Thereafter, the measuring probe 12 is then eventually brought into the measurement position whereby the measuring probe 11 is also brought into an allocated non-measurement position, namely resting on the test sample, scratching it. In the shown exemplary embodiment, for the measuring probe 11, the non-measurement position during the examination using a scanning probe microscope with the measuring probe 10 differs from the non-measurement position allocated to the measuring probe 11 in the examination using a scanning probe microscope by means of the measuring probe 12.

FIG. 3 shows several depictions with further details of the above-described method for examining using a scanning probe microscope by means of several measuring probes 10, 11, 12 in accordance with FIG. 2.

According to depiction a, the measuring probe 10, namely its measuring-active measuring probe part, first comes into contact with the test sample 50. In this position, the measuring probe 11, thus its measuring-active measuring probe part, still exhibits a distance to the test sample 50 which is depicted by means of the guide line 51. When moving the measuring probe receptacle 1 even closer to the test sample 50, according to depiction b, the measuring probe 11 comes closer to the area of the test sample 50 which simultaneously leads to the bending of a measuring probe bar 10a of the measuring probe 10. According to depictions c and d, the same thing happens with the measuring probes 11 and 12 when moving the measuring probe receptacle 1 again even closer to the test sample 50.

The arrangement with measuring probe receptacle 1 and the measuring probes 10, 11, 12 jointly formed thereon is constructed in such a way that the vertical distance between the measuring-active measuring probe parts and the test sample 50 which is set by means of the controlling element 45 is sized such that a stroke necessary for the examination using a scanning probe microscope can also be performed without damaging a measuring probe not used in the respective measurement stages, thus in particular not bringing it into contact with the test sample 50.

When determining the required stroke, production tolerances of the measuring probes, possible deviations in probe coatings as well as the topography of the test sample also have to be taken into consideration. The determination of the distance between the measuring probes 10, 11, 12, namely their measuring-active measuring probe parts and the stroke movement are possible without any problems via simple geometrical relations, taking the probe parameters into account.

FIG. 4 shows a flowchart to illustrate a method for carrying out an examination using a scanning probe microscope.

Initially, the measuring probe is positioned above a sample point of interest in a step 60. In a step 61, the measuring probe is then moved closer to the test sample. Afterwards, the examination using a scanning probe microscope is carried out in a step 62. This can be the measurement of a force-distance curve, for example. However, it is also possible to record several curves simultaneously to thus come to a statistical conclusion. After the examination using a scanning probe microscope, an evaluation of the collected data is carried out which may also be automated, with a view to check if the collected data is reliable (step 70). If the reliability is determined, the question can be posed in step 71 if enough data was collected for the on-going examination. If this question is answered with Yes, the experimental examination can be ended according to step 63.

In the case that the data is not reliable, the question what caused this arises in step 72. The measuring probe interaction or also the measuring probe itself can be named as causes. If such a cause is determined by the user or optionally also automatically, a replacement of the used measuring probe is carried out according to step 64 which, in the chosen exemplary embodiment, solely requires now carrying out the examination using a scanning probe microscope with the next measuring probe. The examination method is continued.

Optionally, it can be provided for treating the new measuring probe, for example by preparing a new cell on the measuring probe according to step 65. This is preferably carried out without replacing the measuring probe receptacle.

If the cause in step 72 should not be found, an individual fault analysis has to be carried out according to step 66 which optionally can also be performed automatically. It can happen, for example, that the preparation of a probe coating is faulty.

Starting from step 66, the examination using a scanning probe microscope can again be continued at any point. If it is determined in the check according to step 71 that not enough data has been collected yet, the examination using a scanning probe microscope has to be continued to collect further data which initially may be carried out with the measuring probe currently used.

According to step 73, the question can be posed if further experiments should be carried out in the area of the same examination section of the test sample. Starting from this, the process can be continued according to step 62 (positive answer) or according to step 60 (negative answer).

FIG. 5 shows another arrangement with a measuring probe receptacle, several measuring probes being jointly arranged thereon.

Several measuring probes 80, . . . , 85, each of which can be implemented as a cantilever, are not directly attached to the measuring probe receptacle 1, but in each case coupled thereto via an allocated actuator 90, . . . , 95. The measuring probes 80, . . . , 85 can be adjusted by means of the actuators 90, . . . , 95, in particular in respect of their angular position and this a distance to the test sample. The actuators 90, . . . , 95 are made of a piezo material, for example. The angle/height adjustment is then carried out by means of applying an appropriate control voltage.

In the exemplary embodiment depicted in FIG. 5, all the measuring probes are aligned in such a way that they terminate in a guide line 110. In the case of a height adjustment of the measuring probe receptacle 1, they would thus all contact the test sample at the same time. However, an individual setting of the measuring probes 80, . . . , 85 is now possible by means of the actuators 90, . . . , 95 which is exemplified in the depiction b in FIG. 5 in which the measuring probes 81, . . . , 85 are lifted in relation to the measuring probe 80 which is realised by means of the actuators 91, . . . , 95. The lifted measuring probes 81, . . . , 85 terminate in a guide line 111. In this way, the measuring probes 80, . . . , 85 may be brought into the allocated measurement position and the allocated non-measurement position individually or in groups one after another or simultaneously.

The features of the invention disclosed in the above description, the claims and the figures can be of importance both taken on their own and in any combination to implement the invention in its different embodiments.

The invention claimed is:

1. A method for examining a test sample using a scanning probe microscope in which:
   a first and a second measurement using a scanning probe microscope are carried out on the test sample using a measuring probe system in which a measuring probe and another measuring probe are formed on a common measuring probe receptacle,
   during the first measurement, in relation to the test sample, the measuring probe is held in a first measurement position and the other measuring probe is held in another non-measurement position, and the test sample is examined with the measuring probe using a scanning probe microscope,
   after the first measurement, by displacing in relation to the test sample, the measuring probe is displaced from the measurement position into a non-measurement position and the other measuring probe from the other non-measurement position into another measurement position, and
   during the second measurement, in relation to the test sample, the measuring probe is held in the non-measurement position and the other measuring probe is held in the other measurement position, and the test sample is examined with the other measuring probe using a scanning probe microscope,
   wherein the displacement in relation to the test sample is performed at least partly by means of a joint movement of the measuring probe and the other measuring probe which comprises a relative movement between the measuring probe receptacle and the test sample.

2. The method according to claim 1, wherein the displacement in relation to the test sample is performed at least partly by means of a discrete movement of the measuring probe and the other measuring probe in which at least the measuring probe or at least the other measuring probe is moved.

3. The method according to claim 2, wherein at least the measuring probe or at least the other measuring probe is moved by displacing an allocated measuring probe bar, optionally by means of a self-deformation.

4. The method according to claim 3, wherein the displacement of the allocated measuring probe bar comprises a swivelling movement of the measuring probe bar by means of which an angular position of the allocated measuring probe bar is changed.

5. The method according to claim 1, wherein the displacement in relation to the test sample for the measuring probe and/or the other measuring probe comprises a height adjustment changing a vertical distance to an examination section of the test sample.

6. The method according to claim 5, wherein the height adjustment is carried out as a relative movement along a displacement direction perpendicular to the examination section of the test sample.

7. The method according to claim 1, wherein the measuring probe receptacle is moved for the displacement in relation to the test sample.

8. The method according to claim 1, wherein at least partially overlapping examination sections on the test sample are examined in the first measurement and the second measurement using a scanning probe microscope.

9. The method according to claim 1, wherein at least one displacement movement selected from the following group a displacement of the measuring probe between the measurement position and the non-measurement position and a displacement of the other measuring probe between the other measurement position and the other non-measurement position.

10. The method according to claim 1, wherein the measuring probe during the displacement between the measurement position and the non-measurement position as well as the other measuring probe during the displacement between the other measurement position and the other non-measurement position stay within an allocated measurement volume.

11. The method according to claim 1, wherein the measuring probe during the displacement from the measurement position into the non-measurement position is arranged above an area of the test sample which was already previously examined using a scanning probe microscope.

12. A measurement system for examining a test sample using a scanning probe microscope, said measurement system comprising:
   a measuring probe system in which a measuring probe and another measuring probe are formed on a common measuring probe receptacle,
   a scanning displacement means which is configured to displace the measuring probe and the other measuring probe in relation to the test sample for the examination of the test sample using a scanning probe microscope, and
   a measuring probe displacement means which is at least coupled to the measuring probe and the other measuring probe for the measuring probe displacement and optionally at least partly integrated with the scanning displacement means, the measuring probe displacement means being configured
   during a first measurement using a scanning probe microscope, to hold the measuring probe in a first measurement position and the other measuring probe in another non-measurement position in relation to the test sample,
   after the first measurement using a scanning probe microscope, to bring the measuring probe from the measurement position into a non-measurement position and the other measuring probe from the other non-measurement position into another measurement position by means of a joint movement which comprises a relative movement between the measuring probe receptacle and the test sample, and
   during a second measurement using a scanning probe microscope, to hold the measuring probe in the non-measurement position and the other measuring probe in the other measurement position.

13. The measurement system according to claim 12, wherein a measuring-active measuring probe part on the measuring probe and a measuring-active measuring probe part on the other measuring probe are arranged with an offset to each other at an edge of the common measuring probe receptacle.

14. The measurement system according to claim 12, wherein the measuring probe and the other measuring probe in the measuring probe system are supported on a diagonal face, in relation to the surface of the test sample, formed on the common measuring probe receptacle which optionally is formed on the measuring probe receptacle by means of a prism-shaped component.

15. The measurement system according to claim 12, wherein the measuring probe and the other measuring probe in the measuring probe system are each formed with a bendable measuring probe bar.

16. The measurement system according to claim 12, wherein the measuring probe and the other measuring probe in the measuring probe system is formed essentially coinciding in relation to at least one measuring probe property selected from the following group of measuring probe properties: spring constant, applied probe substance, probe coating and frequency of resonance.

17. The measurement system according to claim 12, wherein the measuring probe and the other measuring probe are arranged to be height-adjusted by means of the measuring probe displacement means, optionally along a displacement direction perpendicular to an examination section of the test sample.

18. The measurement system according to claim 12, wherein the measuring probe and the other measuring probe are formed displaceable by means of a discrete movement.

19. A measuring probe system for a scanning probe microscope in which a measuring probe and at least another measuring probe are formed on a common measuring probe receptacle, wherein the measuring probe and the at least another measuring probe are displaceable each between a measurement position and a non-measurement position by means of a joint movement which comprises a relative movement between the measuring probe receptacle and the test sample.

20. The measuring probe system according to claim 19, wherein the measuring probe and the at least another measuring probe each include a measuring-active measuring probe part arranged with an offset to each other at an edge of the common measuring probe receptacle.

* * * * *